United States Patent
Viol et al.

(10) Patent No.: US 10,719,488 B2
(45) Date of Patent: Jul. 21, 2020

(54) CONFIGURABLE PROVIDER FOR LAYERED REPOSITORY

(71) Applicant: SAP SE, Walldorf (DE)

(72) Inventors: Markus Viol, Walldorf (DE); Lars Erbe, Stutensee (DE); Stefan Haffner, Hockenheim (DE); Alexander Rauh, Weinheim (DE); Carsten Brandt, Mannheim (DE); Felix Riegger, Mannheim (DE); Christian Voshage, Eppelheim (DE); Axel Warner, Maxdorf (DE)

(73) Assignee: SAP SE, Walldorf (DE)

( * ) Notice: Subject to any disclaimer, the term of this patent is extended or adjusted under 35 U.S.C. 154(b) by 600 days.

(21) Appl. No.: 15/439,806

(22) Filed: Feb. 22, 2017

(65) Prior Publication Data
US 2018/0239787 A1    Aug. 23, 2018

(51) Int. Cl.
*G06F 16/21* (2019.01)
(52) U.S. Cl.
CPC .......... *G06F 16/211* (2019.01); *G06F 16/217* (2019.01)
(58) Field of Classification Search
CPC .......... G06F 16/27; G06F 7/14; G06F 3/0683; G06F 16/178; G06F 3/067; G06F 9/44505; G06F 11/3093; G06F 11/323; G06F 3/0643; G06F 3/0653; G06F 9/50; G06F 3/1224; H04L 67/1097; H04L 41/0226; H04N 19/136
See application file for complete search history.

(56) References Cited

U.S. PATENT DOCUMENTS

| | | | | |
|---|---|---|---|---|
| 7,831,959 | B1* | 11/2010 | Perry | G06F 9/44505 717/121 |
| 2003/0145067 | A1* | 7/2003 | Cover | H04L 29/06 709/220 |
| 2004/0054569 | A1* | 3/2004 | Pombo | G06Q 10/0633 705/7.27 |
| 2008/0127086 | A1* | 5/2008 | Sattler | G06F 8/71 717/121 |
| 2013/0145349 | A1* | 6/2013 | Basak | G06F 9/44505 717/121 |

(Continued)

*Primary Examiner* — Yuk Ting Choi
(74) *Attorney, Agent, or Firm* — Sterne, Kessler, Goldstein & Fox P.L.L.C.

(57) ABSTRACT

Disclosed herein are system, method, and computer program product embodiments for creating and utilizing configuration providers for layered repository facilities. An embodiment operates by creating or loading a custom data structure for a software application, retrieving configuration information from at least one configuration provider, storing the retrieved configuration information in the custom data structure, and associating the custom data structure with the application and a specific layer of a layered repository facility. When this is done across multiple layers of the layered repository for the same software application, configurations can be efficiently managed for different users having different roles and relationships within an enterprise software environment, while maintaining a user experience that is flexible, extensible, dynamic, and yet consistent and familiar across many devices and platforms, even for users having multiple roles and different relationships within the enterprise software environment.

17 Claims, 8 Drawing Sheets

(56) References Cited

U.S. PATENT DOCUMENTS

2013/0179862 A1* 7/2013 Kinder ................ G06F 9/44505
717/121
2014/0013308 A1* 1/2014 Gounares ............ H04L 41/0806
717/125

* cited by examiner

CONFIGURABLE PROVIDER FOR LAYERED REPOSITORY

BACKGROUND

Management of enterprise application configurations in interconnected business environments is becoming more complicated and challenging for enterprise software end users and administrators. Such tasks will generally involve the diverse technology platforms. For example, applications or components of one platform may be written in different programming languages and implemented in different technology stacks from applications and components of another platform. This data must be accessed and managed with a variety of applications across platforms. These applications must also be managed across different types of configuration file formats and/or schemas, which are often mutually incompatible. Enterprises may use these diverse platforms and technology stacks distributed across different business domains within the enterprise, or among other parties with specific roles, such as across partner businesses, vendors, suppliers, client businesses, and personal end users, etc., each of which may have different preferences and desired configurations for user experience.

For parties such as vendors, partners who provide further contributions to enterprise applications, or customers that are also businesses themselves, such parties may have multiple roles, may be involved in multiple domains of the enterprise, and/or may have multiple different or changing relationships with the enterprise. Managing these roles and relationships creates further complexity, which significantly increases difficulty in providing consistent configurations for a reliably coherent user experience with users in different roles across the same enterprise software applications. Accordingly, in such environments, it becomes difficult to manage configuration information for the numerous applications that must be managed across parties in multiple different roles or domains that must use these same applications implemented across multiple technology stacks and diverse platforms. End users and administrators in today's enterprise environments face what may become overwhelming challenges in accessing, configuring, and managing many different applications available on many diverse platforms in a consistent and efficient manner.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for creating and utilizing configuration providers for layered repository facilities.

Figure 1:
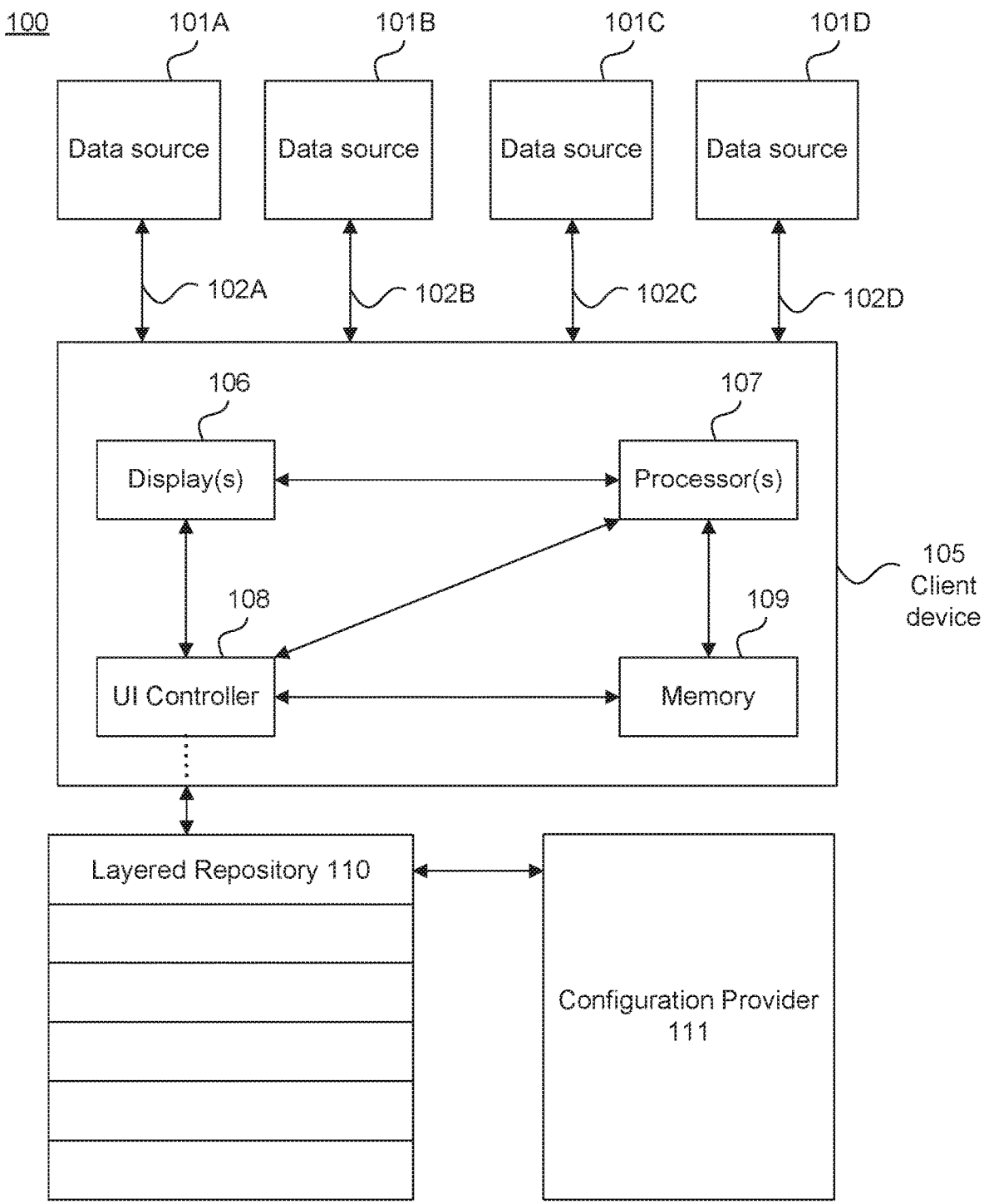
FIG. 1 is a block diagram providing an illustration of an exemplary distributed system including a layered repository facility and configuration provider, according to an example embodiment.

FIG. 1 is an illustration of an exemplary distributed system 100 in which embodiments described herein may be implemented. In some embodiments, distributed system 100 includes a client device 105 that may be communicatively coupled to data sources 101A-101D through wired and/or wireless connections 102A-102D, respectively. The number of data sources illustrated in FIG. 1 is merely exemplary and is not intended to limit the embodiment. The number of data sources may be any quantity without departing from the scope of this disclosure. Client device 105 may be any type of computing device having one or more processors 107, one or more memories 109, a user input device(s) (for example, a touch screen, mouse, track pad, track ball, keypad, keyboard, microphone, or predictive text input) (not shown), and a wired and/or wireless communications infrastructure capable of receiving and transmitting data over a network.

As a non-limiting example, computing device 105 may include, but is not limited to, a mobile phone or other mobile device, a personal digital assistant (PDA), a computer, a cluster of computers, a set-top box, a smart watch, a smart phone, a tablet, or other types of device capable of processing instructions and receiving and transmitting data to and from humans and other computing devices. Data sources 101A-101D may be implemented as any type of device or application that is capable of generating, collecting, and/or providing data to client device 105. For example, data sources 101A-101D may be any combination of an application installed on client device 105 or on other client devices associated with a user or users, a server, sensors and/or databases.

In some embodiments, client device 105 may include user interface (UI) controller 108 for processing data provided by data sources 101A-101D and presenting the processed data on one or more displays 106 of client device 105. For the purposes of this disclosure, displays may be interactive terminal screens such as LCD or OLED touch screens; however, a "display" may be any kind of output device, including a printer, speaker, screen reader, signaling device, serial port, or any other output device. Connections 102A-102D may be connections external to client device 105, internal to the client device (such as from an installed application), or any combination of external and internal connections. External connections may be implemented as network connections, where such connections may be over any network or combination of networks that may carry data communication. Such a network may include, but is not limited to, a wired (e.g., Ethernet) or a wireless (e.g., Wi-Fi, CDMA, GSM, GPRS, EDGE, 2G, 3G, 4G, LTE, 5G, etc.) network, or a combination thereof. In addition, the network may include, but is not limited to, a local area network, medium area network, and/or wide area network such as the Internet and may support protocols and technology including, but not limited to, Internet or World Wide Web protocols and/or services. Intermediate network routers, gateways, or servers may be provided between components of distributed system 100 depending upon a particular application or environment. Internal connections may be implemented as an internal bus that connects an application installed within client device 105 to other components of client device 105.

In some embodiments, data sources 101A-101D may generate, provide, access, reference, collect, and/or store any type of data. In some embodiments, system 100 may be implemented within an enterprise environment and data sources 101A-101D may generate, provide, access, reference, collect, and/or store data associated with the enterprise environment. Such data may include, but is not limited to, business contacts, emails, project reports, project timelines, images, internal reports, flowcharts, diagrams, and graphs. In an embodiment, memory 109 is used to store data accessible by client device 105. As a non-limiting example, memory 109 may be implemented using any type of recording medium coupled to an integrated circuit that controls access to the recording medium. The recording medium may be, for example and without limitation, a semiconductor memory, a solid state memory, a memory card or thumb drive, an optical disc, a hard disk, or other similar type of memory or storage device. Moreover, memory 109 may be integrated within client device 105 or as a stand-alone device communicatively coupled to client device 105 via a direct connection. As a non-limiting example, memory 109 may be implemented as an internal memory device of client device 105, or a removable external nonvolatile memory device, such as any of various magnetic and/or optical disc media, battery-backed random access memory (RAM), NAND flash memory card, CompactFlash card, Secure Digital (SD) card, magnetoresistive random access memory (MRAM), ferroelectric random access memory (FeRAM), phase-change memory (PCM), or other similar type of memory device.

In some embodiments, client device 105 may suffer from limitations such as reduced memory capabilities when compared to any of data sources 101A-101D. Therefore, data stored at memory 109 may include, but is not limited to, a subset of data found at any of data sources 101A-101D or combinations thereof. For example, memory 109 and any of data sources 101A-101D may be implemented as relational databases. In an embodiment, the data stored at memory 109 may be synchronized with data sources 101A-101D. Additional means by which data may be provided to memory 109 or UI controller 108 would be apparent to a person skilled in the relevant art given this description.

In some embodiments, the available roles and/or domains available for selection by a user of client device 105 are limited to specific domains and/or roles that are relevant to the user's duties. In other words, specific domains and/or roles are associated with permissions for accessing certain content and/or data sources. In a non-limiting example, roles may include managers, associates, or employees. The types of roles that are available for selection for generation of the overview panel are dependent on the organizational structure of the specific enterprise. In other words, certain roles may be permitted to access certain data sources and/or content and restricted from others. Further, domains are to be understood as a broad categorization of a user's role, such as a department in which the user's role is located within the organizational structure of the enterprise. In a non-limiting example, domains may include different departments of the enterprise such as purchasing, financing, administrative, and payroll. These domains are merely exemplary and other types of domains are possible without departing from the scope of this disclosure. In some embodiments, the available domains may be selectable.

In a non-limiting example, data source 101A may store data 103A which may include content A and content B. Similarly, data source 101B may store data 103B which may include content C, content D, and content E, data source 101C may store data 103C which may include content F, and data source 101D may store data 103D which may include content G and content H.

Client device 105 may be associated with and/or operated by a user. As discussed above, the user may have one or more roles within an organization which are part of one or more domains. Based on the role(s) and domain(s) associated with the user, client device may generate an overview page or panel 116 customized to provide only certain data related to the user's role(s) and/or domain(s). In other words, different users will be presented with different overview panels comprising customized data related specifically to the different users' role(s) and/or domain(s). In some embodiments, role(s) and/or domain(s) are associated with certain content and/or data sources from which content should be retrieved and displayed within an overview panel. These associations may be defined by, for example, a permissions file, an access file, or any other mechanism by which role(s) and/or domain(s) may be mapped to or associated with specific content and/or data sources.

Communicatively coupled to the client device 105, and optionally also to the UI controller 108, is a layered repository 110 facility. In actual use, a layered repository 110 facility may be part of a set of user interface flexibility services and/or a flexibility framework and/or a flexibility infrastructure, with various interfaces to allow different kinds of access to the layered repository 110. Of these, for purposes of illustration in FIG. 1, only the layered repository 110 is shown in FIG. 1, without depicting other surrounding structures. Greater detail about services and frameworks surrounding a layered repository facility can be found in FIG. 2, as described below. Layered repository 110 facility may be self-contained in a single location, or it may be partly or fully distributed in a system or network of remote and/or local systems.

Layered repository 110 is further communicatively coupled to configuration provider 111. The configuration provider 111 may provide configuration data to layered repository 110. In an exemplary embodiment, configuration provider 111 may provide configuration data in response to a request for configuration data, which may include a specific request for configuration data with respect to a specific layer in the layered repository 110. In some embodiments, the corresponding layer for provided configuration information may be determined based on a corresponding user, a corresponding user's role, or a corresponding user's relationship to other parties and any layer(s) corresponding to the relevant other parties.

Like the layered repository 110, the configuration provider 111 may be part of a set of user interface flexibility services and/or a flexibility framework with various interfaces to allow different kinds of access to the layered repository 110 and/or the configuration provider 111. Of these, for purposes of illustration in FIG. 1, only the layered repository 110 and the configuration provider 111 are shown in FIG. 1, without depicting other surrounding structures. Greater detail about services and frameworks surrounding a layered repository facility can be found in FIG. 2, as described below.

Figure 2:
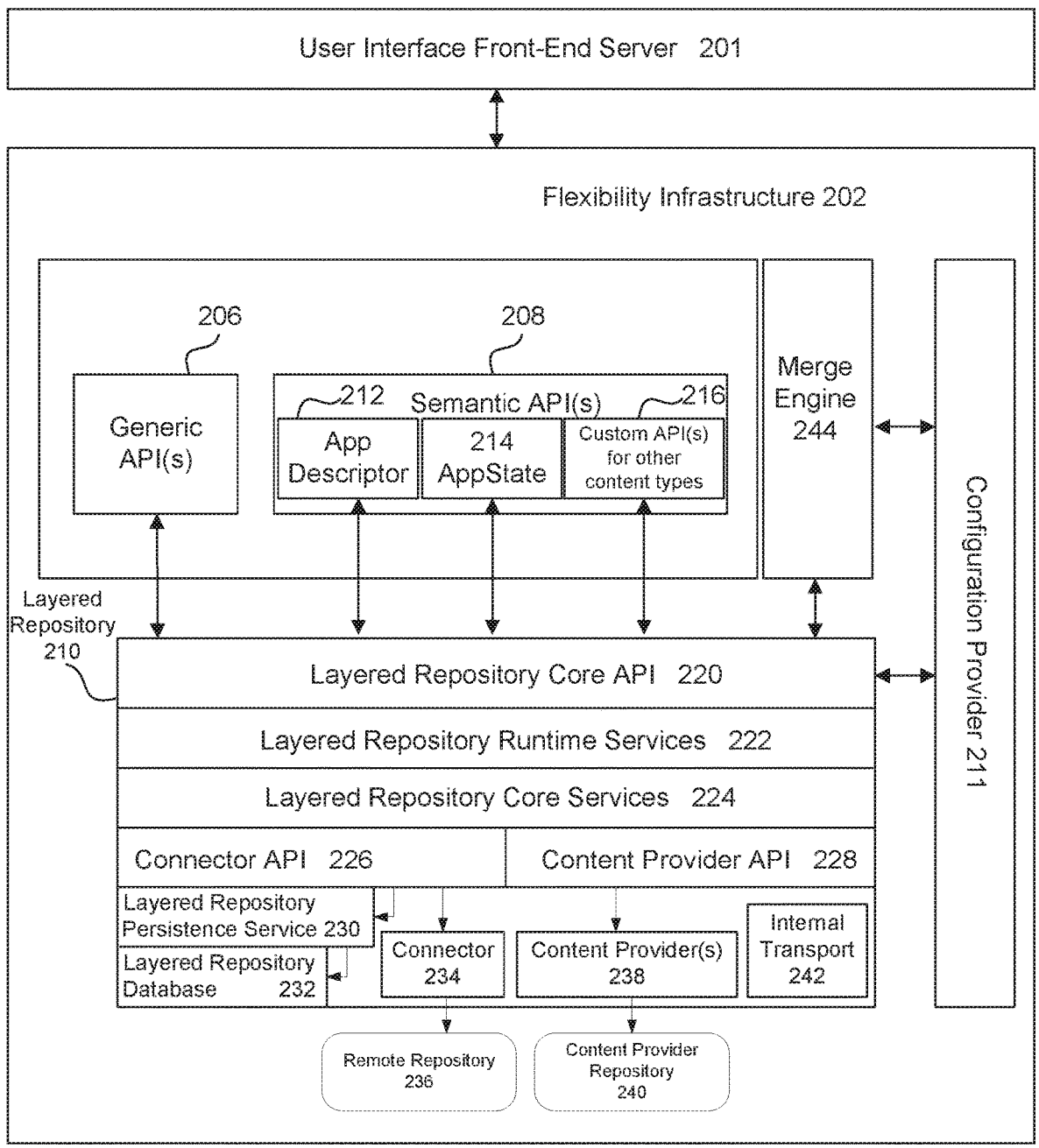
FIG. 2 is a block diagram conceptually illustrating a set of user interface flexibility services including a flexibility framework encompassing a layered repository and configuration provider for the layered repository, according to an example embodiment.

FIG. 2 is a block diagram conceptually illustrating a set of user interface flexibility services including a flexibility framework encompassing a layered repository and configuration provider for the layered repository, according to an example embodiment.

A set of user interface flexibility services 200 may include a user interface front-end server 201. In an embodiment, the user interface front-end server 201 may provide a standard way, such as by Internet and/or World Wide Web standards, for a client device 105 and/or user interface controller 108 to access specially configured user interface elements delivered via flexibility infrastructure 202, including layered repository 210, and ultimately controlled by configuration provider 211. Alternatively, user interface front-end server may use non-standard or proprietary services to interface with a compatible client device 105 or user interface controller 108.

In order to facilitate delivery of user interface elements in an accessible format, flexibility infrastructure 202 may include any number of application programming interfaces (API). For illustrative purposes, a number of APIs are shown in elements 206 and 208 of FIG. 2, including elements 212-216. However, in actual use, any number and type of APIs may be used; the APIs depicted in FIG. 2 merely show one non-limiting example.

Generic API 206 may be any number of standard, uncustomized APIs. For example, for implementing web services, generic API 206 may include Representational State Transfer (REST) and/or Simple Object Access Protocol (SOAP), or alternatively may use proprietary APIs alone or in combination with known standard APIs. In some embodiments, generic API 206 may encompass at least one schema, such as for accessing the layered repository 210 by way of uniform resource identifiers (URI), such as a uniform resource locator (URL) or other unique identifier, key, or name.

Semantic APIs 208 may be custom-created for specific applications or content types. In some embodiments, semantic APIs may be used, among other APIs from inside the layered repository, to import data, files, objects, etc., into the layered repository from the outside, serving as remote content APIs for user-facing or user-provided content. Similar functionality exists on the back end via content provider API 228. A semantic API 208 may be based on a generic API 206 that is customized and/or extended so as to handle application-specific parameters for applications accessed via the layered repository 210 and/or configured via the configuration provider 211.

In an embodiment, semantic APIs 208 may typically include AppDescriptor 212 and AppState 214. AppDescriptor 212 may be used for, among other things, uniquely identifying different bodies of material pertaining to specific applications. AppState 214 may be used for identifying state information of specific applications, such as execution state data. For any number of other applications or content types, other custom APIs may be provided. Custom APIs 216 may, in practice, be any number of programmatic interfaces or APIs, which may operatively interface with the layered repository core API 220 of layered repository 210.

In an exemplary embodiment, content deployment for framework as a service (FaaS) may rely on one or more semantic APIs 208. A deployer service (not shown) may call a semantic API 208 to import remote content into the layered repository 210. Semantic API may accept an archive (not shown), which may be compressed. The archive may contain files (not shown), which may be in a format that is known to the a layered repository import service (not shown), which may be part of layered repository runtime services 222. In this non-limiting example, the file may contain structured data, such as in JavaScript Object Notation (JSON) format, which may represent a collection of layered repository file objects (not shown), each having a file identifier, allowing for content of each file to be taken into the layered repository 210 to store each file via the layered repository core API 220.

Layered repository core API 220 essentially provides an interface to certain internals of the layered repository 110, including layered repository runtime services 222. In some embodiments, layered repository core API 220 may also provide an interface to layered repository core services 224.

Any of the interfaces or APIs described herein are essentially access mechanisms that may employ any number of paradigms, such as RESTful web services. Any of these access mechanisms may further employ any number of technologies, such as binary, text, or markup files for configuration, such as Extensible Markup Language (XML) documents.

Layered repository runtime services 222 may perform tasks for utilizing specific functionality of the layered repository 210 as part of the layered repository framework. Such tasks include but are not limited to loading and/or caching data and/or objects accessed through the layered repository 210, loading and/or storing attributes relating to the layered repository 210, indexing data and/or objects corresponding to the layered repository 210, referencing and dereferencing data and/or objects in the layered repository 210, and similar operations that may particularly focus on content.

Layered repository core services 224 may perform tasks internally managing the structure of the layered repository 210 as part of the layered repository framework. Such tasks include but are not limited to managing information pertaining to relationships of layering, which may include hierarchical, relational, or other types of structured or unstructured information specifically for layering in the layered repository 210. For more information on layering, see, for example, FIG. 3 and as described below. Layered repository core services 224 may also handle transactions within and across layers of the layered repository 210. As an extension of this core service functionality, layered repository 210 may also have special mechanisms for internal transport 242, which may solely be for internal moving, handling, and/or processing of transactions, data, and/or objects within the layered repository 210, which may be furnished internally without any interface to the outside of the layered repository 210.

Connector API 226 may allow for compatibility with storage for the layered repository 210 and for information pertaining thereto. For example, connector API 226 may interact with layered repository persistence service 230, which serves to ensure that all data, objects, and transactions are persistently recorded and backed up so as to avoid data loss. In the exemplary embodiment shown in FIG. 2, layered repository persistence service 230 is in turn connected to layered repository database 232 as a storage backing. In actual use, this database may be viewed as together with or separate from the layered repository, and in some embodiments, layered repository database 232 may interface directly with connector API 226 or with connector 234 implementation(s).

Connector 234 may be any implementation needed for the layered repository 210 to connect externally to storage such as to a remote repository 236, which may be used in situations such as for remote synchronization, remote backups, or remote archiving. In this exemplary embodiment, remote repository 236 is connected to the connector 234 implementation, which is in turn interfaced to the layered repository 210 via the connector API 226. In actual use, remote repository 236 may be connected via other means, such as directly by an extension to the layered repository database 232, directly to the layered repository persistence service 230, or may even interface directly with the layered repository connector API 226.

Elements 226-236 may be primarily used for enterprise management of the layered repository and corresponding data and objects therein or referenced thereby. Elements 228, 238, and 240 may be used for content providers, which may be outward-facing interfaces or third-party service- and/or content-provider entities (not shown) which may augment user experience via remotely loaded graphical user interface (GUI) assets such as tiles, icons, background images, and other basic GUI assets or related content. Outside content provider(s) (not shown) may also provide other content, such as multimedia streams, file downloads, or remote protected content via the layered repository 210 in accordance with configuration(s), such as access controls or other preferences, provided from configuration provider 211, rather than allowing a client device 105 to access the outside content provider's data as from independent external data sources 101A-D, etc.

To this end, layered repository 210 may be equipped with a content provider API 228 separate from connector API 226, which may interface with any outside content providers, or any other content providers kept separate from the layered repository database 232 or remote repository 236, via content provider 238 implementation(s). Content provider 238 implementations may be provided by the enterprise for content providers or by content providers for the enterprise, depending on accessibility of the content provider API 228. Like the connector 234 implementation, content provider 238 implementation(s) may be any implementation(s) needed for the layered repository 210 to connect externally to a given content provider repository 240. In practice, content provider repository may be any number of repositories for any number of content providers, accessed via any number of content provider 238 implementations.

Merge engine 244, along with configuration provider 211, may interact with each other and with the layered repository 210, such as via the layered repository core API 220 or any other mechanism in the layered repository 210. Together with configuration provider 211, merge engine 244 may be used for managing changes or adaptations in configurations, such as whether or not changes or adaptations are applied across layers. Specific details of this management are described below along with FIGS. 3 and 4.

Figure 3:
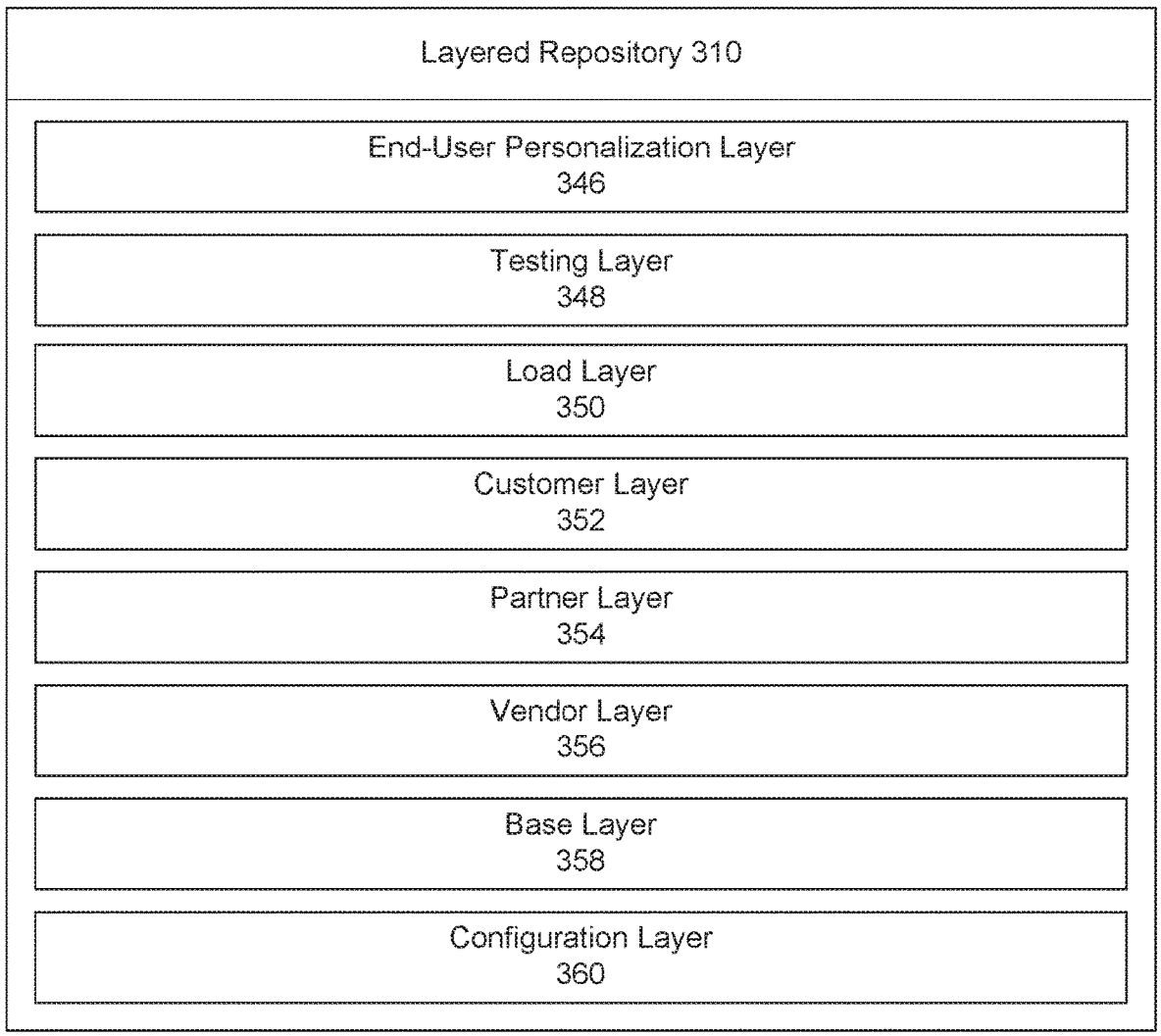
FIG. 3 is a block diagram conceptually illustrating a structure of layering within a layered repository as part of the layered repository framework, according to an example embodiment.

FIG. 3 is a conceptual illustration of an exemplary layer structure within a layered repository 310 as part of the layered repository framework. The example depicted shows an order of eight layers. In other embodiments in actual practice, any number of layers may be used, in any order, and in any kind of structural arrangement, such as hierarchical, flat, relational, or any combination thereof. Each layer may have corresponding configuration information (also known as settings or configurations) for each of one or more applications. Depending on each layer, the settings or configuration information may be different depending on requirements and preferences for each application at each layer.

The end-user personalization layer 346 is the layer closest to the end user. Configurations in this layer may be changed, altered, modified, or adapted by the end user for customization to meet the end user's own needs and/or preferences. In some embodiments, such customization may be preserved persistently, such that when an end user wishes to access an application through flexibility services or flexibility infrastructure from another device using the same flexibility services or flexibility infrastructure, that end user will be able to use the same settings previously specified by the same end user, without the end user needing to reconfigure settings for each application on each device.

The testing layer 348 is a layer in which changes, alterations, modifications, or adaptations to configurations may be tested before being applied to another layer, such as the end user personalization layer 346, although any such changes may be applied to any other layer. In some embodiments, the testing layer 348 may allow for configuration adaptations to be tested first before deployment to other layers, such that if there is a problem with the configuration in the testing layer 348, then problematic configurations are not applied to other layers where the problematic configurations could then cause more extensive problems. In actual practice, in some embodiments, configuration information may be preserved across changes, alterations, modifications, or adaptations, in the form of a repository of revisions (not shown) that may be rolled back to specific configuration(s), such as any configuration(s) known to produce a desired result. Testing layer 348 may also be referred to as a customization layer or a test layer, in other embodiments.

The load layer 350 may be configured to perform in a similar way to the testing layer 348. In an embodiment, load layer 350 may be specifically used for deploying a merged configuration from other layers, such as customer layer 352 and partner layer 354, although any combination of any number of layer configurations may be merged. Configurations across layers may be merged, for example, to include expanding (or restricting) access at different layers to certain features that may be provided by a vendor, including base functionality or upgrades, by a partner, such as add-ons or extension, or any other combination of features, in some non-limiting examples.

In this way, the layered repository 310 and the load layer 350 may be configured in such a way as to detect a difference, such as between customer layer 352 and vendor layer 356, and automatically provide a merged difference of configuration information to the end-user personalization layer 346, bypassing or superseding the vendor layer 356. If there were no changes or differences between configurations below the end-user personalization layer 346 and base layer 358 or configuration layer 360, then the only merge that would take place would be from the end-user personalization layer 346 and the underlying unchanged configuration information. In an exemplary embodiment, such a merge could be staged at the load layer 350 for end-user presentation, or alternatively merged by a just-in-time merge via other services or APIs in or above the layered repository 210.

Another characteristic of the load layer 350 may be that configurations in the load layer need not be persistently stored to be available across devices and platforms within the layered repository framework. Instead, the load layer 350 may be used to deploy merged configurations at runtime (also known as just-in-time merging/loading), obviating the need for multiple iterations and permutations of configuration information at each layer when a simpler merge of existing configuration information at other layers would be sufficient for a particular layer and/or application(s) within that layer.

The customer layer 352, partner layer 354, vendor layer 356, base layer 358, and configuration layer 360, each may have similar and intuitive uses depending on the corresponding provider in the chain of layers shown in this exemplary embodiment of FIG. 3. For example, in an embodiment, configuration layer 360 may be used simply to initialize settings for a default configuration to account for all configuration options that may not be explicitly set at a higher layer. In some embodiments that may lack an explicitly designated "configuration layer," the lowest layer may effectively act as a default configuration layer.

Base layer 358 may be specific settings for a specific enterprise solution designed by an architect of this layered repository. Vendor layer 356 may be vendor-specific customizations or rebranding settings for cases where a vendor may want to add its own branding, trademarks, images, or other content in a user-facing GUI, so as to control certain commercial aspects of a user experience (UX). Partner layer 356 may include specific settings for third-party add-on functionality or extensions, where a vendor may have contracted out to a third party for specific features. Customer layer 352 may include customer-specific customizations which may be provided as a service from a vendor to a business customer as part of a service agreement.

At each layer, any changes may be merged up to the next layer to provide a consistent set of configuration information and customizations across a complex enterprise software platform. These changes need not all be for end users at the top of the layered repository. For example, key users as part of a business customer may be permitted to access the layered repository 310 via the customer layer 352, in such a way that may provide a GUI with different functionality and greater access control permissions. Access controls and permissions may be defined by roles and relationships, such as vendor, partner, key user, customer, end user, etc. In a non-limiting exemplary embodiment, a key user at the customer layer 352 may be presented with a business dashboard to control certain backend features for customer support facing an end user, which may also include changing end-user configuration information at the end-user personalization layer 346 on behalf of the end user. Likewise, similar actions could take place by a key user at the vendor layer 356 for other users at the partner layer 354 or at the customer layer 352.

Notwithstanding the exemplary embodiment depicted in FIG. 3, the layering and layers in any actual layered repository may be organized, arranged, disposed, or ordered in any sequence, scheme, hierarchy, or lack thereof. There may be any number of layers, applications per any layer, any number of users per any layer, etc., not limited to any particular number of settings for any or all layers.

Figure 4:
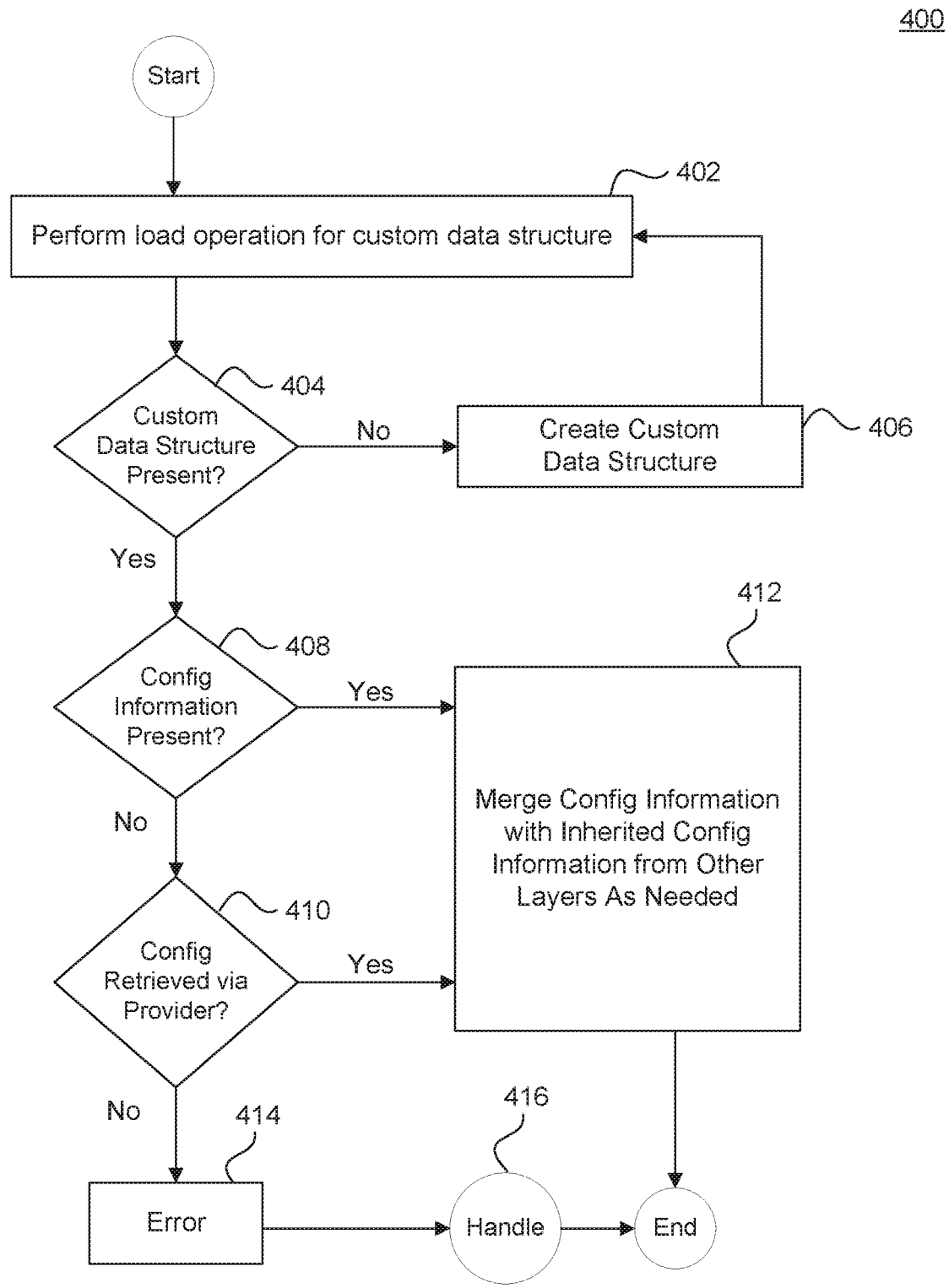
FIG. 4 is a flowchart illustrating a process for applications utilizing the configuration provider within a layered repository framework, according to an example embodiment.

FIG. 4 shows process 400, illustrated by a flowchart illustrating a process for utilizing the configuration provider within a layered repository framework, so as to retrieve appropriate configuration information to run the application from any corresponding layer of the layered repository, according to an example embodiment. This process 400 may be used by or for any application that would be accessing or otherwise utilizing the layered repository. In actual use, any application may access or utilize the layered repository in this manner or in other similar ways.

In 402, a processor, such as one of the processors 107 or 804, performs an operation to load a custom data structure for a software application to interface with configuration provider 111. Upon executing the load operation, the processor will determine at 404 whether or not the custom data structure is already present for a given application in the layered repository. In an exemplary embodiment, this processor operation may be initiated by an application in the layered repository 110. If the appropriate data structure exists, then it may be loaded, and execution may then proceed to 408. If such a custom data structure does not yet exist for the given software application, one will be created in 406, and execution will return to the load operation in 402, before proceeding to 408 via 404. In an embodiment, execution may skip a second run of 404 if 406 has been executed.

This custom data structure may be a matrix, vector, array, linked list, queue, stack, tree, class object, or other structure that may be used to pass data, tokens, or any information pertaining to configuration, by reference or by value or by other suitable means, between the configuration provider 111, and ultimately any software application(s), running on hardware of client device(s) 105 via the layered repository 110. In some embodiments, the basic format of the custom data structure(s) may be alike for each application, or there may be application-specific variations.

This custom data structure may contain at least one address or other locator corresponding to at least one configuration provider 111. At least some of the exemplary embodiments herein may show one configuration provider 111, but in practice, any number of configuration providers may be available. The corresponding element of the custom data structure for identifying the configuration provider(s) may thus be an array, vector, matrix, etc., so as to accommodate a list that may contain multiple configuration providers.

Even in embodiments where the format of each custom data structure is alike for each application, the data structures may be adapted to allow for an arbitrary number of parameters or associated objects, such as may be allowed by dynamic memory allocation. In other embodiments, such as for specific applications can be configured to have a fixed number of objects or parameters, in a non-limiting example, static allocation may also be used for at least some custom data structures.

In 408, the processor may perform at least one operation on the loaded custom data structure to determine whether or not an appropriate configuration exists therein for the corresponding application and its corresponding layer in the layered repository 110. In actual use, this determination may be performed by a comparison of certain identifier bits, flags, tokens, sequences, magic numbers, or other more complex means. If it is affirmatively determined that there is appropriate configuration information contained in the loaded custom data structure, then execution may proceed to 412 for configuration storage or merger options. If no appropriate configuration exists in the custom data structure, execution proceeds to 410 to retrieve configuration information from a configuration provider 111.

In 410, the processor may iterate through each configuration provider stored in the custom data structure's list that may contain multiple configuration providers, querying each configuration provider for appropriate configuration information corresponding to the given application and layer. Among the application, layered repository, configuration provider(s), and any intervening framework(s), the corresponding application and layer may be identified by other structured data, such as provided in data structures or classes of an API. In an embodiment, appropriate configuration information may be selected as corresponding to an application descriptor, such as AppDescriptor 212, or via other custom APIs 216 for other custom data types. When a configuration provider 111 contains configuration information, such as a configuration file, pertaining to a requesting application in a layered repository 110, the corresponding configuration information may be returned to the requesting application via an appropriate framework or API such as within the flexibility infrastructure 202, and execution then proceeds to 410. Otherwise, execution proceeds to 414 in an error state or exception state.

Figure 5:
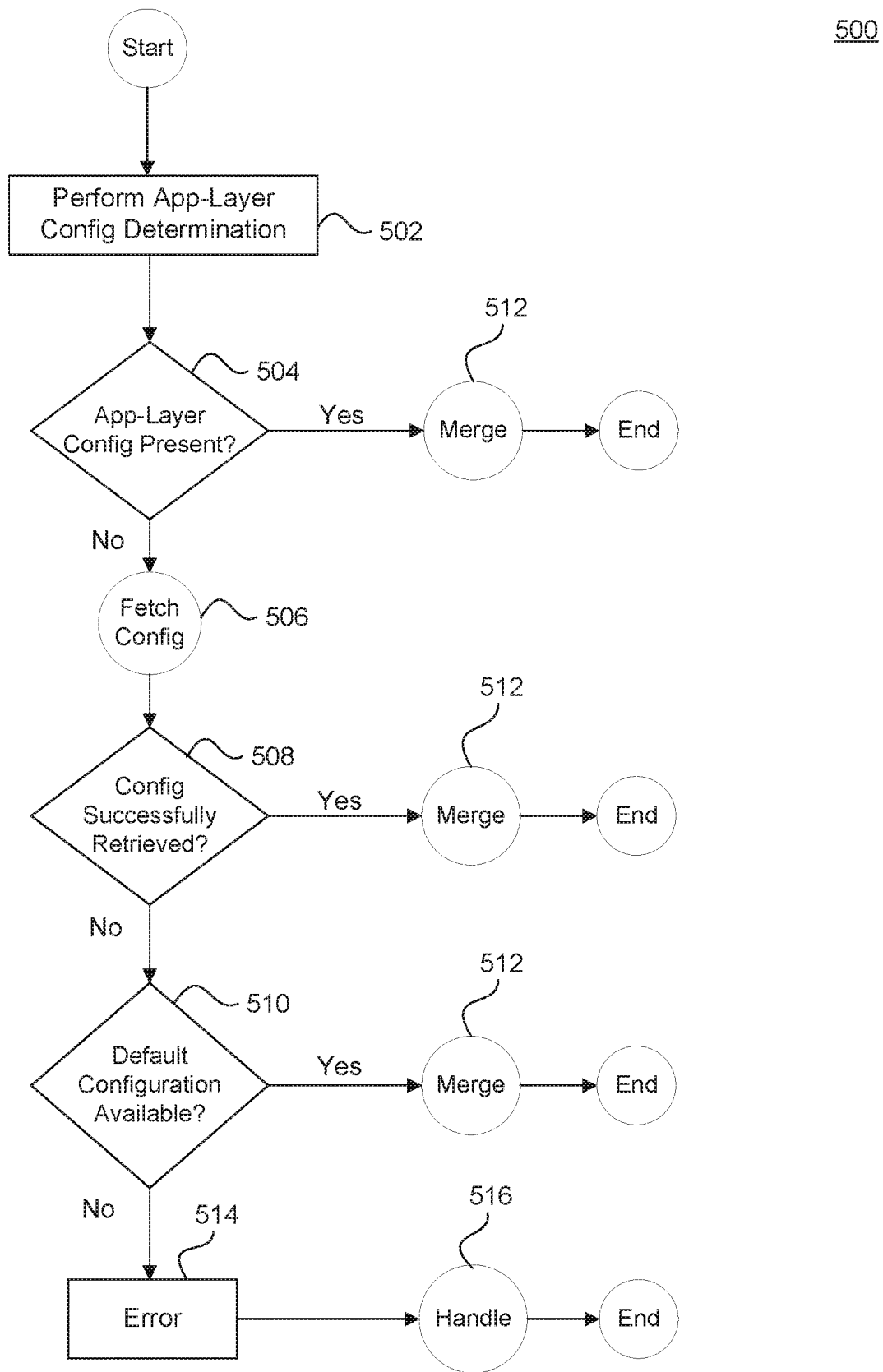
FIG. 5 is a flowchart illustrating a process for the configuration provider initializing application configurations within a layered repository framework, according to an example embodiment.

In 414, if no corresponding configuration is found in any known configuration provider identified in the custom data structure, then the configuration provider returns an error or exception for handling in 416. In response to an error or exception from the configuration provider 111, error handling or exception handling may be performed by any of a configuration provider 111 itself, the layered repository 110 on a per-layer basis, and/or the requesting application on a per-application basis. Such handling may resemble process 500 as described below and as shown in FIG. 5. Error handling or exception handling 416 may require manual input from a user in at least one layer, or alternatively may source default configuration information from a predetermined location outside of the configuration provider(s) specified in the custom data structure, or some combination of the above, in some non-limiting exemplary embodiments. Upon successful completion of handling the error or exception, an appropriate configuration is loaded as in 402 and verified as in 404 and 408, and execution then proceeds to 412 for configuration storage or merger options.

In 412, the configuration information may be applied to the corresponding application in its corresponding layer of the layered repository 110. For example, in one embodiment, configuration information newly obtained from the configuration provider 111 may be stored persistently in the custom data structure pertaining to the application. This step may be accomplished via the layered repository persistence service 230, backed by the layered repository database 232 and/or otherwise stored in at least one remote repository 236. This is one way in which the configuration may be preserved and easily reproduced on another client device on the layered repository, ensuring a consistent user experience across multiple devices running the same application(s) in any given layer of the layered repository. This goal may also be carried out in an alternative embodiment, using merge engine 244 at execution or runtime. The configuration may be retrieved such as in 402-408 from the configuration provider 111 every time it is needed, but instead of (or alongside) using persistent storage, the retrieved configuration information in the custom data structure may be merged against other necessary configuration information corresponding to other layers in the layered repository.

Whereas persistent storage is advantageous because of streamlined operation and reduced overhead from avoiding more frequent calls to a configuration provider 111, relying on the merge engine 244 for just-in-time merging of configuration information saves storage and reduces complexity by avoiding storage of multiple configurations in different places. Once the appropriate configuration is in place as applied to the corresponding application, process 400 is complete, and may be performed as needed for any other applications in other layers.

Process 400 is disclosed in the order shown above in this exemplary embodiment of FIG. 4. In practice, however, the operations disclosed above, alongside other operations, may be executed sequentially in any order, or they may alternatively be executed concurrently, with more than one operation being performed simultaneously, or any combination of the above. In any of the operations of process 400, such as 402-416, communication to and from the configuration provider 111 may use any API or conform to any protocol, standard or otherwise.

FIG. 5 shows process 500, illustrated by a flowchart illustrating a process for utilizing the configuration provider within the layered repository framework, so as to initialize the configuration provider for a new application using a dynamically extensible configuration provider framework, according to an example embodiment. This process 500 may be used by or for any application that is newly installed, loaded, or configured, so that it may access or otherwise utilize the layered repository.

Process 500 is one of any number of ways to set up a new configuration dynamically, or to handle an error or exception where configuration information is lacking such as in an error state or exception state as described above. By way of example, the non-limiting exemplary embodiment in FIG. 5 is shown with one application designed to access the layered repository. However, in actual use, any type of application and any number of applications may access or utilize the layered repository in this manner or in other similar ways.

In 502, a processor, such as one of the processors 107 or 804, performs an operation to determine whether an application in a layered repository lacks appropriate configuration information corresponding to the application and/or its layer, which may be any layer within the layered repository 110 facility. In an exemplary embodiment, this processor operation may be initiated by a configuration provider 111. In some embodiments, such an operation may be provided in response to a determination by the application or layered repository that no existing configuration exists in a custom data structure corresponding to the application or layered repository. In other embodiments, 502 may be performed by the processor upon a spontaneous request from a configuration provider 111, including by an automated periodic process schedule in the configuration provider 111, or by, for example, a cron job or daemon elsewhere in a system corresponding to a configuration provider 111, as some non-limiting examples.

In 504, if an appropriate configuration exists, then execution may terminate, or may proceed to 512, to follow an operation similar to 412 depending on AppState 214, merging and/or storing configuration information as needed. Otherwise, upon determining that a particular application at a given layer lacks appropriate configuration information, the configuration provider 111 may, in 506, traverse a hierarchy of sources for proper default configuration information specific to the given application. For example, in some embodiments, if none is already within the configuration provider 111, configuration provider may, in 510, iterate over a list of addresses or URLs, for authoritative hosts, servers, mirrors, or remote repositories of default configuration information from which to retrieve default configuration settings specific to a given application. If no default configuration is available anywhere, then an error state or exception state is entered in 514, for handling in 516, similar to the error handling or exception handling described in 416 above.

In some embodiments, accessing outside information may further require security measures, such as use of secure transit protocols, encrypted storage, trusted infrastructure, cryptographic signing for verification, checksums and/or data integrity measures, etc. Once any necessary precautions are taken, in some embodiments, configuration provider 111 may ensure that any configuration information that needs to be retrieved from a remote location is then retrieved and stored in any of the configuration provider 111, layered repository 110, database 232, or any other appropriate location in the flexibility framework or flexibility infrastructure 202.

In 508, once configuration information has been retrieved, it may be merged and/or stored with other adapted configuration information in 512. For example, in an exemplary embodiment, where a base layer 358 may be the lowest (default) layer in a layered repository 310, it may not be necessary to keep the original configuration as retrieved from a remote source, and it may instead be more efficient to keep at the base layer a configuration with alterations intended for any other higher layer of the given layered repository. Specific operations of this storing or merging of configurations may work in similar fashion to 410. In some embodiments, these operations may be initiated by the configuration provider 111, merge engine 244, or any other processing component of the flexibility infrastructure 202.

Process 500 is disclosed in the order shown above in this exemplary embodiment of FIG. 5. In practice, however, the operations disclosed above, alongside other operations, may be executed sequentially in any order, or they may alternatively be executed concurrently, with more than one operation being performed simultaneously, or any combination of the above.

Figure 6:
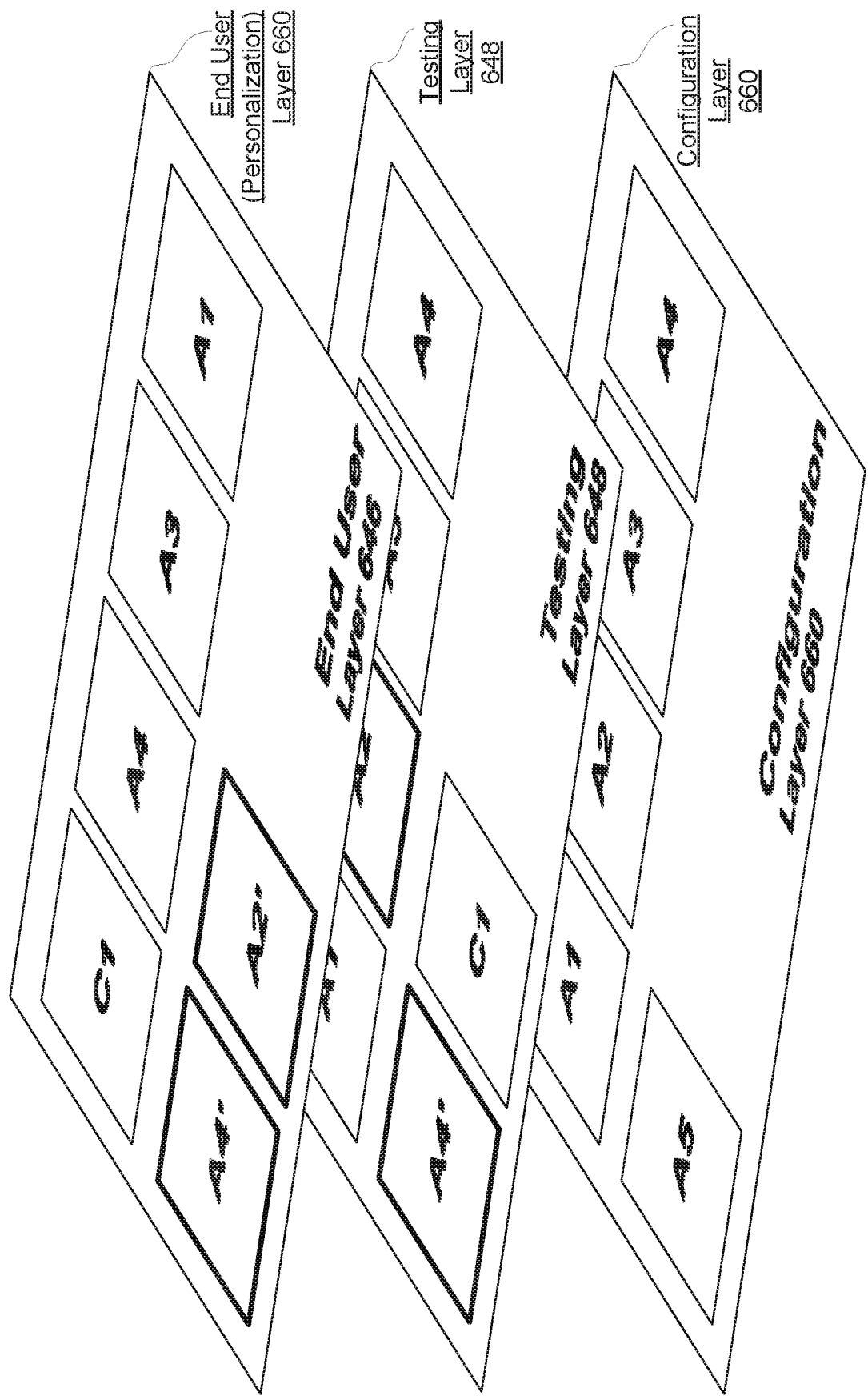
FIG. 6 is an alternative view of a layered repository with different application configurations at different layers having different applications and configurations available to each, in one example embodiment.
Figure 7:
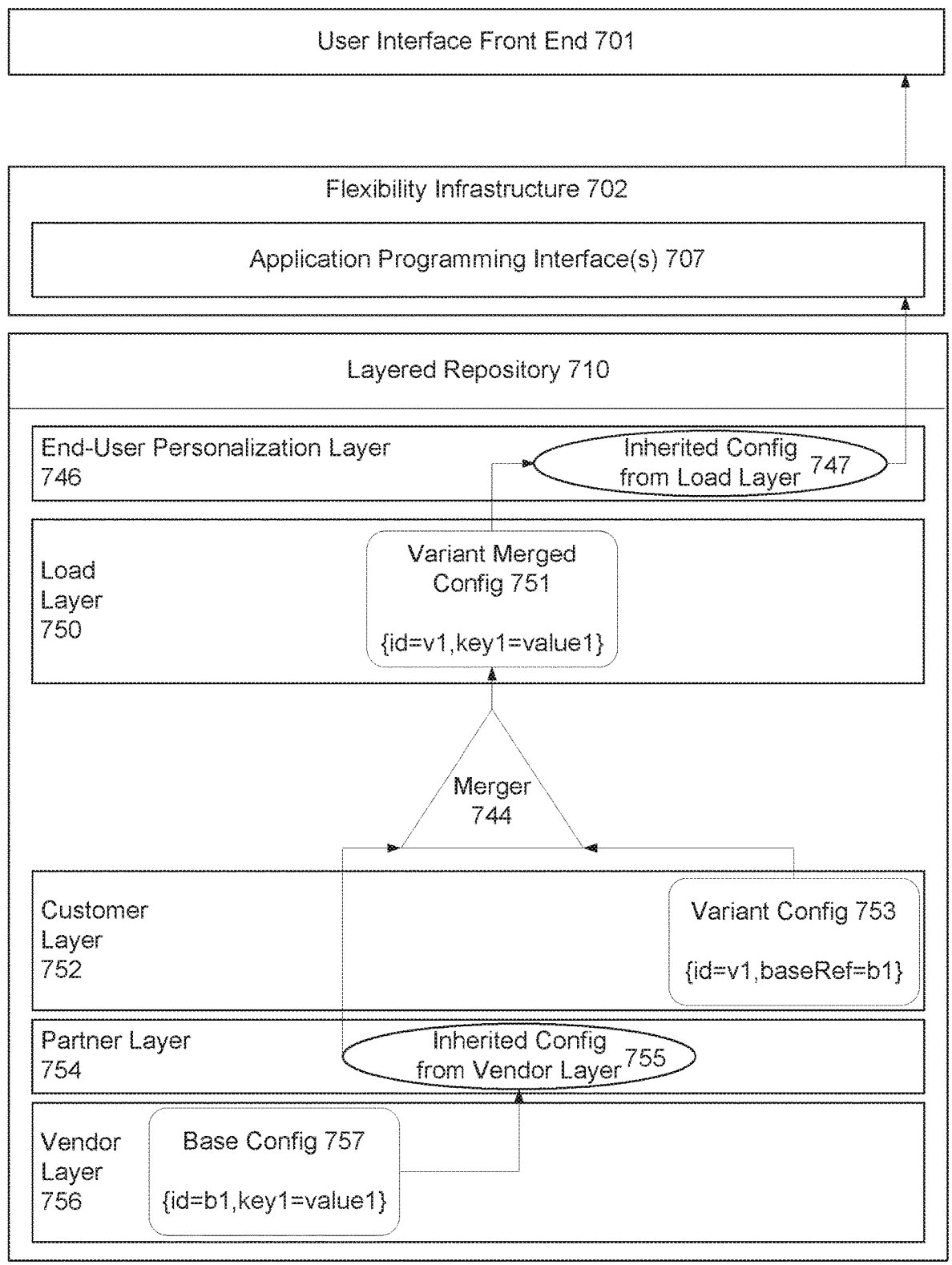
FIG. 7 is an alternative view of a layered repository with different application configurations at different layers having different applications and configurations available to each, further showing inheritance and merger, according to an exemplary embodiment.

FIGS. 6 and 7 present alternative views of layered repositories with different application configurations at different layers. In each case, different configurations at each layer may be stored, such as in configuration provider 211 and/or layered repository persistence service(s) 230, in some embodiments, or they may be merged upon execution or just-in-time, according to other non-limiting exemplary embodiments.

FIG. 6 depicts three exemplary layers having multiple applications and configurations available to each. In this exemplary embodiment, the same applications A1-A4 are available across all layers. A5 is available at the configuration layer 660, but not at higher layers in this exemplary embodiment. Testing layer 648 includes some changes to configuration information for some applications (A2 and A4). These changes are merged with end user layer 646, although the arrangement of applications and configurations is different between the end user layer 646 and testing layer 648, because the end user layer 646 may still have applied a final customization to ensure consistent and flexible user experience across devices and platforms.

Additionally, the end user layer 646 and testing layer 648 each may have different configurations for the same application (A4) in this exemplary embodiment. Ability to manage applications and multiple configurations may be allowed to an arbitrary degree at the end user layer for personalization, customization, and dynamic extensibility, limited only by roles and relationships designated by the enterprise software vendor at the configuration layer 660 or key users in layers below the end user layer 646.

The depiction in FIG. 6 may represent a spatial arrangement of tiles or icons representing applications and/or data on a graphical touch screen or similar user interface, but this depiction need not be indicative of any physical representation or display. As a non-limiting exemplary embodiment, FIG. 6 shows how applications may be made available at some or all different layers, but which may have different configurations and/or customizations at some layers, which may depend on predefined roles and/or flexible user preferences.

FIG. 7 similarly depicts different configurations at different levels for an application, and provides one non-limiting example of inheritance of configurations where there are no changes and merging configurations where there may be changes, so as to generate intermediate configurations at runtime or execution of an application, without necessarily storing and retrieving a separate configuration file for every layer.

In FIG. 7, user interface front end 701 corresponds to an end-user-facing aspect of the user interface front-end server 201. Flexibility infrastructure 702 corresponds to 202, with APIs 707 being simplified here for illustrative purposes, corresponding to the APIs of 206, 208, 214-216, etc. In some embodiments, these APIs ultimately interface on the front end of the layered repository 710, which may similarly correspond to 110, 210, or 310, etc., in any of these non-limiting exemplary embodiments.

In the embodiment of FIG. 7, the lowest layer here is vendor layer 756, which has a corresponding base configuration 757. In this particular example, the base configuration 757 includes but is not limited to two key-value pairs, "id" and "key1" with corresponding values of "b1" and "value1" respectively.

Partner layer 754, in this exemplary embodiment, does not have any unique variations for its configuration information, and so by default may inherit the configuration of the layer below. For illustrative purposes, an oval-shaped placeholder is used to show this inheritance relationship, both in inherited configuration 755 from vendor layer and in inherited configuration 747 from load layer. However, these depicted placeholders need not represent any actual configuration file or data structure separately stored for each layer; in the absence of specific changes or adaptations, etc., to a layer's configuration, instead of copying configuration information for each layer, layers without changes may reference appropriate configuration information from a nearby layer where available, without creating any additional copy of configuration in memory or storage.

For example, in an embodiment, each layer may have a reference to an appropriate configuration. In a base configuration at the lowest layer, such as base configuration 757, there may be a "self" reference (not shown) to indicate that this base configuration 757 is the only configuration information needed at this layer. Partner layer 754, in an embodiment, may only have a reference to the vendor layer 756 for the base configuration 757. However, where there are variations in the configuration information, variant configurations may be stored in full or alternatively in part as a differential patch to the previously referenced configuration (not shown). In the latter case, variant configurations would still need to reference inherited configurations from other layers, and only apply changes from the appropriate variant configuration delta (not shown). Here, a merged set of configuration information may be created and temporarily kept in memory, but need not be written to persistent storage, saving storage space and avoiding conflicts or revision management overhead associated with multiple merge versions.

Customer layer 752, in an exemplary embodiment, has an altered configuration that is different from the partner layer 754 with inherited configuration 755 from vendor layer 756 with base configuration 757. Here, the key "id" that originally had the value "b1" in base configuration 757 must instead have the value "v1" in the customer layer 752, requiring variant configuration 753 to redefine this value. Additionally, variant configuration 753 may have an entirely new key-value pair, such as a new key "baseRef" with corresponding value "b1" which may be used to relate to the base configuration 757, although this is not necessarily the case. Variant configurations may have any number of changes of any type and for any reason.

Load layer 750, in an embodiment, here inherits configuration information from lower layers 752, 754, and 756. Because the configurations across these layers are not consistent or identical, these configurations must be merged. Merger 744 is a merge operation, such as that performed by merge engine 244. In this exemplary embodiment, the output of the merger 244 is a variant merged configuration 751. The variant merged configuration 751 may differ from any of the previous configurations depending on any rules governing the merger 244. Here, for example, the existing "id" key now inherits the change from the variant configuration 753. Variant configuration 753 as shown in this embodiment had left the key "key1" untouched in its changes from the base configuration 757. Merger 744, as with merge engine 244, may be configured to pass key-value pairs that have not been modified, from lower layers' configurations to higher layers' inherited configurations, for example. As another example configuration, merger 744, as with merge engine 244, may be configured not to pass newly defined key-value pairs not found in the base configuration 757.

The merger rules applied at merger 744 by merge engine 244, or by other modules, may be customized with fine granularity. Merger rules may be edited manually by an administrator, or they may be generated automatically by an administrator program. By customizing merger rules at different layers of the layered repository, the actual configurations in use may be dynamically adjusted and extended by end users and key users, such as business customers, while still ensuring that control remains in the hands of the intended key users, such as vendors, partners, or certain other business customers.

These merger rules may include known techniques of access controls and/or permissions, object-oriented inheritance principles, and pattern matching schemes, including basic comparisons, formal grammars, regular expressions, etc. This level of control provides enterprise software administrators, business customers and partners, key users, and end users with improved flexibility, modularity, and extensibility of configurations and applications. Inheritance of configurations across layers, along with specially defined merger rules to govern how changes are inherited or not, further contribute to consistency of user experience and user-interface familiarity across different layers in a layered repository facility, which may be especially helpful to users or businesses having multiple roles within an enterprise software environment.

Additionally, configuration information and changes thereto may be generated by users, machines, or programs, using any number of interfaces such as APIs, protocols, or user tools, including text editors, web-based configuration front-ends, graphical configurators, voice input, environment sensors, etc.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Such files may follow data models including but not limited to Universal Data Model (UDM), entry-attribute-value (EAV) model, object-attribute-value (OAV) model, vertical database model, open schema, closed schema, or any other standard, nonstandard, or proprietary data models. Configuration data may be structured, unstructured, in flat-file databases, column-oriented databases, row-oriented databases, or other types of database formats.

The data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

For handling, extracting, abstracting, or analyzing information, any number of other paradigms or frameworks may be employed or interfaced with in the process, such as Unstructured Information Management Architecture (UIMA), Data Discovery and Query Builder (DDQB), General Architecture for Text Engineering (GATE), Named-Entity Recognition (NER), etc., or any non-standard or ad hoc approach that may be useful for processing, parsing, tagging, or contextualizing configuration information in any of the forms or models listed above.

Interfacing or interconnection among various systems and layers may employ any number of mechanisms, such as any number of protocols, programmatic frameworks, or application programming interfaces (API), including but not limited to Discovery Service (DS), NSUserDefaults, Web Services Description Language (WSDL), Message Exchange Pattern (MEP), Web Distributed Data Exchange (WDDX), Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, or virtually any other language, with any other libraries or schemas, in any kind of framework, runtime environment, virtual machine, interpreter, stack, engine, or similar mechanism, including but not limited to Node.js, V8, OpenUI5, AngularJS, Express.js, Backbone.js, Ember.js, DHTMLX, React, among many other non-limiting examples.

Any database management system or similar program, application, or architecture may be used for managing data on the backend. Examples include but are not limited to SAP HANA, SYBASE, ORACLE, IBM DB2, MS-SQL Server, PostgreSQL, MySQL, MongoDB (or other NoSQL implementations), among other database management systems, types, and paradigms; these databases may be queried with any corresponding languages or procedural extensions and any supersets or subsets, such as SQL and variants thereof, including SQL/PSM, PL/SQL, SQL PL, SPL, T-SQL, DML, ABAP, Open SQL, etc.

User interfaces described herein may conform to any design model, architecture, or architectural pattern, which may be flat or hierarchical, single-page or multiple-page, layered or non-layered, or other models, patterns, or architectures. Applicable interface design models or architectural patterns include but are not limited to model-view-controller (MVC), model-view-adapter (MVA), model-view-presenter (MVP), model-view-viewmodel (MVVM), presentation-abstraction-control (PAC), presenter first (PF), strategy pattern (SP), policy pattern (PP), observer pattern (OP), or other related concepts.

Any configuration provider such as disclosed herein may compatibly interface with, incorporate, or be an integral part of, more comprehensive enterprise data management methods, such as Master Data Management (MDM), Single Customer View (SCV), Business Intelligence (BI), or any other enterprise, business, or customer data integration, analytics, or application management platforms.

Figure 8:
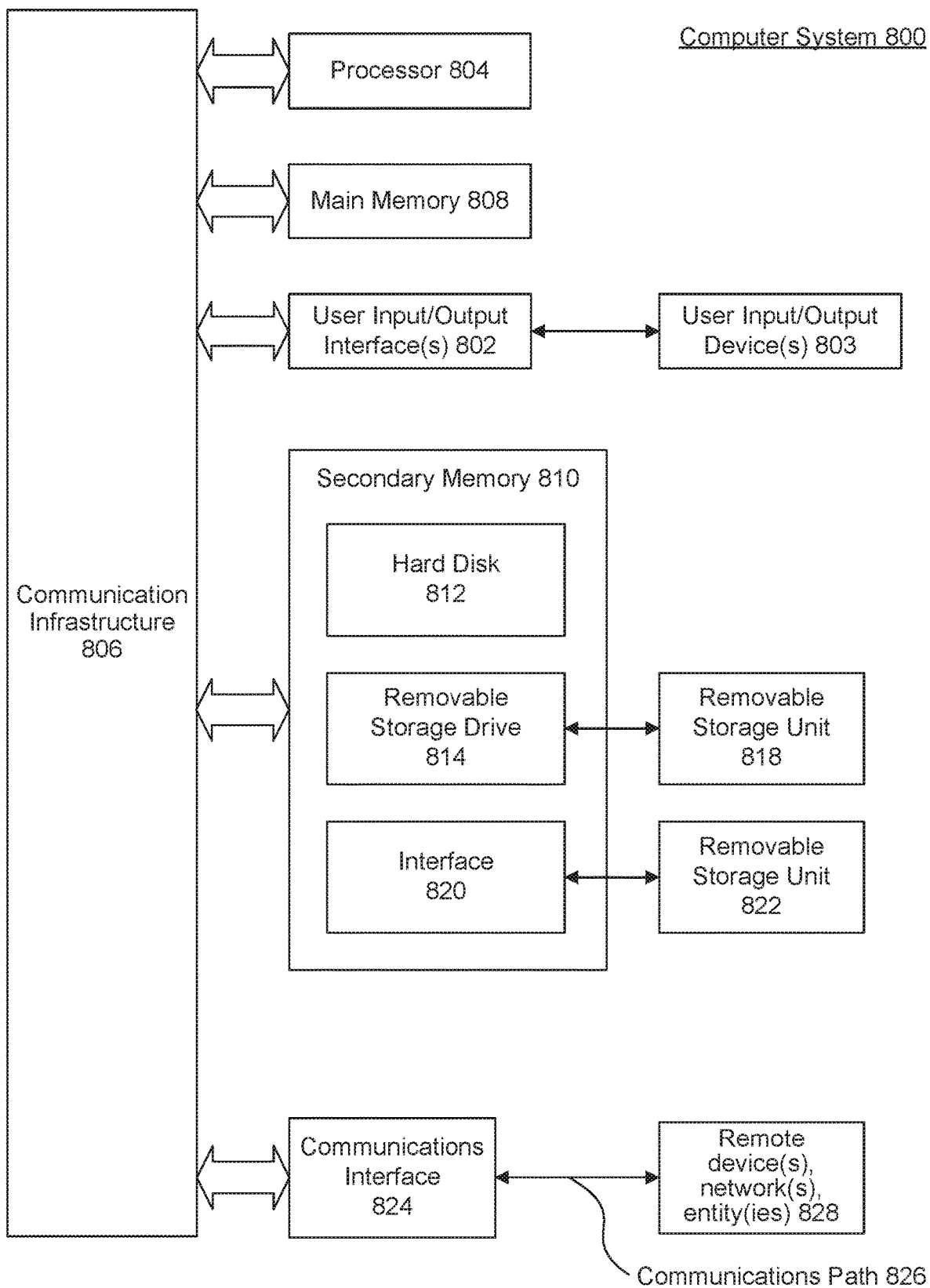
FIG. 8 is an example computer system useful for implementing various embodiments.

Various embodiments may be implemented, for example, using one or more well-known computer systems, such as computer system 800 shown in FIG. 8. Computer system 800 may be used, for example, to implement process 400 of FIG. 4 and/or process 500 of FIG. 5. For example, computer system 800 may determine the presence or absence of configuration information, determine whether configuration information is appropriate for a particular application and layer, traverse a list of locations to retrieve appropriate configuration information, and store or merge retrieved configuration information with other configuration information for a particular application and layer.

Computer system 800 includes one or more processors (also called central processing units, or CPUs), such as a processor 804. Processor 804 is connected to a communication infrastructure or bus 806.

Computer system 800 also includes user input/output device(s) 803, such as monitors, keyboards, pointing devices, etc., which communicate with communication infrastructure 806 through user input/output interface(s) 802.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

A computer system may also be any one of a personal digital assistant (PDA), desktop workstation, laptop or notebook computer, netbook, tablet, smart phone, smart watch, or embedded system, to name a few non-limiting examples.

Any such computer system 800 may run any type of application associated with a layered repository facility, including legacy applications, new applications, etc.

Computer system 800 may be a client or server, accessing or hosting any applications through any delivery paradigm, including but not limited to remote or distributed cloud computing solutions, local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), or infrastructure as a service (IaaS); or a hybrid model including any combination of the foregoing examples or other comparable services or delivery paradigms.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the configuration provider for layered repository using data processing devices, computer systems and/or computer architectures other than that shown in FIG. 8. In particular, embodiments may operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method of providing configuration information from a layered repository to at least one software application, the method comprising:

loading, by at least one processor, a custom data structure for the software application, wherein the custom data structure comprises a configuration provider list referencing at least one configuration provider;

interfacing, by the at least one processor, via at least one application programming interface (API), the software application with the at least one configuration provider of the configuration provider list in the custom data structure, wherein the at least one configuration provider comprises an automated service;

checking, by the at least one processor, the custom data structure to ascertain contents of the custom data structure corresponding to a first set of configuration information associated with a user;

upon determining, by the at least one processor, based at least in part on one or more roles associated with the user, that the configuration information is appropriate for the software application and the software application's corresponding layer in the layered repository:

writing, by the at least one processor, the configuration information into the custom data structure;

storing, by the at least one processor, the custom data structure in storage corresponding to the corresponding layer of the layered repository;

performing, by the at least one processor, the loading, the interfacing, the checking, the determining, the writing, and the storing, with respect to a first set of configuration information and a second set of configuration information, and with respect to a first layer of the layered repository and a second layer of the layered repository; and merging, by the at least one processor, the first set of configuration information with the second set of configuration information, according to a first set of configuration merger rules, to produce a merged set of configuration information, wherein the merged set of configuration information is a result of a just-in-time merging performed automatically at runtime, without accessing the merged set of configuration information from a persistent storage device.

2. The method of claim 1, wherein the first set of configuration merger rules is determined in advance by an administrator program between at least two layers of the layered repository;

wherein a second set of configuration merger rules is determined in advance by a vendor default setting; and wherein the first set of configuration merger rules is different from the second set of configuration merger rules.

3. The method of claim 1, further comprising:

executing, by the at least one processor, the software application according to the merged set of configuration information, to produce a first result on a first computer terminal device; and executing, by the at least one processor, the software application according to the merged set of configuration information, to produce the first result on a second computer terminal device.

4. The method of claim 1, further comprising:

executing, by the at least one processor, the software application according to the merged set of configuration information, to produce a first result on a first computer terminal device; and wherein the first result is output on a display apparatus as at least one graphical element of a user interface in a pattern in accordance with the merged set of configuration information.

5. The method of claim 4, further comprising:

creating, by the at least one processor, a reference to the first set of configuration information stored in the first layer of the layered repository, from within the second layer of the layered repository, wherein the second layer of the layered repository has no corresponding configuration information for the software application; and executing, by the at least one processor, the software application, from the second layer of the layered repository;

upon executing the software application from the second layer of the layered repository:

loading, by the at least one processor, the first set of configuration information from the reference within the second layer of the layered repository.

6. The method of claim 1, further comprising:

upon determining, by the at least one processor, that the custom data structure does not yet exist for the software application:

creating, by the at least one processor, the custom data structure for the software application; and associating, by the at least one processor, the custom data structure with the first layer of the layered repository;

upon determining, by the at least one processor, that the custom data structure does not yet contain configuration information:

reading, by the at least one processor, the configuration provider list of the custom data structure;

accessing, by the at least one processor, the at least one configuration provider referenced in each entry of the configuration provider list; and upon determining, by the at least one processor, that the at least one configuration provider accessed, by the at least one processor, contains the first set of configuration information appropriate for the software application and the software application's corresponding layer in the layered repository:

writing, by the at least one processor, the first set of configuration information into the custom data structure; and storing, by the at least one processor, the custom data structure in storage corresponding to the corresponding layer of the layered repository.

7. A system, comprising:

a memory; and at least one processor coupled to the memory and configured to:

load a custom data structure for the software application, wherein the custom data structure comprises a configuration provider list referencing at least one configuration provider;

interface, via at least one application programming interface (API), the software application with the at least one configuration provider of the configuration provider list in the custom data structure, and wherein the at least one configuration provider comprises an automated service;

check the custom data structure to ascertain contents of the custom data structure corresponding to a first set of configuration information associated with a user; and upon determining, based at least in part on one or more roles associated with the user, that the configuration information is appropriate for the software application and the software application's corresponding layer in a layered repository:

write the configuration information into the custom data structure;

store the custom data structure in storage corresponding to the corresponding layer of the layered repository;

perform the loading, the interfacing, the checking, the determining, the writing, and the storing, with respect to a first set of configuration information and a second set of configuration information, and with respect to a first layer of the layered repository and a second layer of the layered repository; and merge the first set of configuration information with the second set of configuration information, according to a first set of configuration merger rules, to produce a merged set of configuration information, wherein the merged set of configuration information is a result of a just-in-time merging performed automatically at runtime, without accessing the merged set of configuration information from a persistent storage device.

8. The system of claim 7, wherein the first set of configuration merger rules is determined in advance by an administrator program between at least two layers of the layered repository;

wherein a second set of configuration merger rules is determined in advance by a vendor default setting; and wherein the first set of configuration merger rules is different from the second set of configuration merger rules.

9. The system of claim 7, the at least one processor further configured to:

execute the software application according to the merged set of configuration information, to produce a first result on a first computer terminal device; and execute the software application according to the merged set of configuration information, to produce the first result on a second computer terminal device.

10. The system of claim 7, the at least one processor further configured to:

execute the software application according to the merged set of configuration information, to produce a first result on a first computer terminal device; and wherein the first result is output on a display apparatus as at least one graphical element of a user interface in a pattern in accordance with the merged set of configuration information.

11. The system of claim 10, the at least one processor further configured to:

create a reference to the first set of configuration information stored in the first layer of the layered repository, from within the second layer of the layered repository, wherein the second layer of the layered repository has no corresponding configuration information for the software application; and execute the software application, from the second layer of the layered repository;

upon executing the software application from the second layer of the layered repository:

load the first set of configuration information from the reference within the second layer of the layered repository.

12. A non-transitory computer-readable device having instructions stored thereon that, when executed by at least one computing device, cause the at least one computing device to perform operations comprising:
  loading a custom data structure for the software application, wherein the custom data structure comprises a configuration provider list referencing at least one configuration provider;
  interfacing, via at least one application programming interface (API), the software application with the at least one configuration provider of the configuration provider list in the custom data structure, and wherein the at least one configuration provider comprises an automated service;
  checking the custom data structure to ascertain contents of the custom data structure corresponding to a first set of configuration information associated with a user; and
  upon determining, based at least in part on one or more roles associated with the user, that the configuration information is appropriate for the software application and the software application's corresponding layer in a layered repository:
    writing the configuration information into the custom data structure;
    storing the custom data structure in storage corresponding to the corresponding layer of the layered repository;
  performing the loading, the interfacing, the checking, the determining, the writing, and the storing, with respect to a first set of configuration information and a second set of configuration information, and with respect to a first layer of the layered repository and a second layer of the layered repository; and
  merging the first set of configuration information with the second set of configuration information, according to a first set of configuration merger rules, to produce a merged set of configuration information, wherein the merged set of configuration information is a result of a just-in-time merging performed automatically at run-time, without accessing the merged set of configuration information from a persistent storage device.

13. The non-transitory computer-readable device of claim 12, wherein the first set of configuration merger rules is determined in advance by an administrator program between at least two layers of the layered repository;
  wherein a second set of configuration merger rules is determined in advance by a vendor default setting; and
  wherein the first set of configuration merger rules is different from the second set of configuration merger rules.

14. The non-transitory computer-readable device of claim 12, further comprising:
  executing the software application according to the merged set of configuration information, to produce a first result on a first computer terminal device; and
  executing the software application according to the merged set of configuration information, to produce the first result on a second computer terminal device.

15. The non-transitory computer-readable device of claim 12, further comprising:
  executing the software application according to the merged set of configuration information, to produce a first result on a first computer terminal device; and
  wherein the first result is output on a display apparatus as at least one graphical element of a user interface in a pattern in accordance with the merged set of configuration information.

16. The non-transitory computer-readable device of claim 15, further comprising:
  creating a reference to the first set of configuration information stored in the first layer of the layered repository, from within the second layer of the layered repository, wherein the second layer of the layered repository has no corresponding configuration information for the software application; and
  executing the software application, from the second layer of the layered repository;
  upon executing the software application from the second layer of the layered repository:
    loading the first set of configuration information from the reference within the second layer of the layered repository.

17. The non-transitory computer-readable device of claim 12, further comprising:
  upon determining that the custom data structure does not yet exist for the software application:
    creating the custom data structure for the software application; and
    associating the custom data structure with the first layer of the layered repository;
  upon determining that the custom data structure does not yet contain configuration information:
    reading the configuration provider list of the custom data structure;
    accessing the at least one configuration provider referenced in each entry of the configuration provider list; and
    upon determining that the at least one configuration provider accessed contains the first set of configuration information appropriate for the software application and the software application's corresponding layer in the layered repository:
      writing the first set of configuration information into the custom data structure; and
      storing the custom data structure in storage corresponding to the corresponding layer of the layered repository.

* * * * *